Sept. 25, 1934.   G. S. MANN   1,974,780

ADJUSTABLE PIPE COUPLING

Filed Sept. 29, 1932

INVENTOR

George Smith Mann

Patented Sept. 25, 1934

1,974,780

UNITED STATES PATENT OFFICE 1,974,780

ADJUSTABLE PIPE COUPLING

George Smith Mann, Los Angeles, Calif.

Application September 29, 1932, Serial No. 635,378

3 Claims. (Cl. 285—91)

Overhead irrigation by sprinkling is sometimes accomplished by the use of portable surface pipe lines made up of lengths of pipe joined together by means of some form of coupling having angular adjustment to permit laying on surfaces of uneven contour. Revolving sprinklers are placed at intervals on the line which distributes the water like rainfall over an area adjacent to the surface pipe line. Since the line is taken apart at the joints when it is carried to a new location, it is obviously desirable to employ a coupling which is coupled and uncoupled with the least possible amount of time and effort and without the use of tools.

Angularly adjustable pipe couplings fitted with a gasket forced into effective sealing position by the use of outside force cannot comply with these requirements due to the considerable time and effort required to adjust the means used to secure the coupling elements together.

This invention relates to and has for a purpose the provision of an angularly adjustable pipe coupling structurally characterized in a manner to be coupled with the utmost ease and dispatch, and, as a consequence of the force of internal fluid pressure within the piping, in a manner to form an effective seal between the coupling elements, and as a consequence of the internal fluid pressure being set aside, in a manner to unseal and permit the uncoupling of the coupling elements with the utmost ease and dispatch,—the whole to the end that the moving from one location to another on surfaces of uneven contour of portable surface pipe lines be facilitated.

Another object of this invention is to provide an angularly adjustable pipe coupling, the parts of which are extremely simple and of inexpensive construction.

It is the further purpose of this invention to provide an angularly adjustable pipe coupling having inner and outer elements so constructed that the ball or inner element of the conventional ball and socket type coupling is replaced by an inner element of nonspherical shape formed in a manner to confine against displacement, an elastic ring gasket between the co-acting coupling elements for deformation under the action of internal fluid pressure so as to hermetically seal the joint between the coupling elements, all the while limiting angular adjustment of the coupling element to a predetermined maximum, beyond which an effective seal could not be obtained. Only one form of this invention will be described, and the novel features thereof pointed out in claims.

Figure 1:
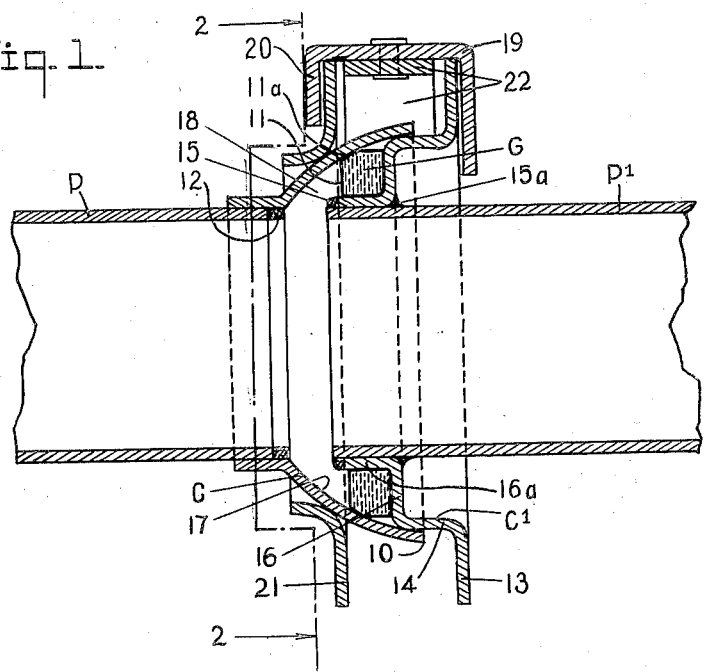
Figure 2:
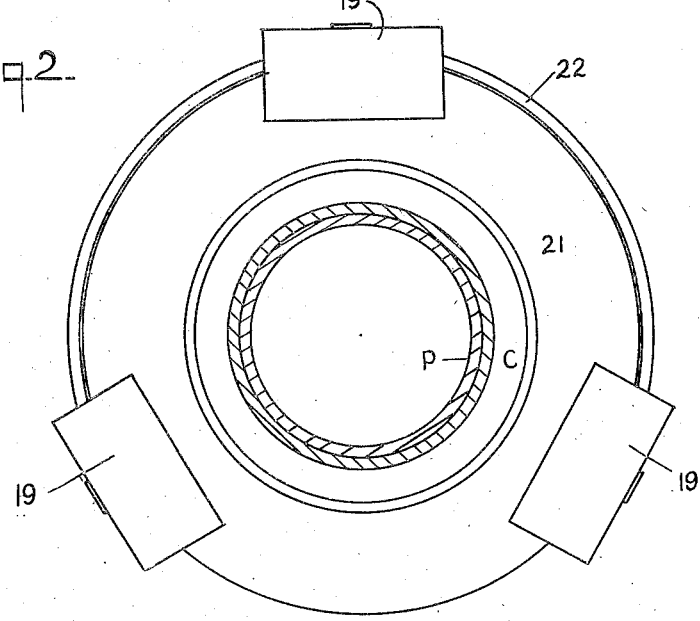

In the accompanying drawing, Figure 1 is a view showing, in central section, one form of adjustable coupling embodying this invention, connecting to pipe sections; Figure 2 is a transverse sectional view taken on the line 2—2 of Figure 1.

Referring specifically to the drawing in which similar reference characters designate similar parts in each of the views, this invention in its present embodiment consists of a pair of coupling elements C and C¹, gasket G and lugs to secure the coupling elements together.

The outer annular coupling element C consists of a spherical segment of approximately 180° in extent of concavo-convex cross section and having a perforation to which a pipe section is adapted to be connected.

The inner annular coupling element C¹ is of stepped construction in cross section and consists of a perforated disc in-turned at its inner peripheral edge to form a shoulder 16a extending axially and said disc having a collar 14 extending axially from its outer peripheral edge and said collar having an outwardly extending fixed flange 13.

The plane surfaces 16 and 16a of the element C¹ are at approximately 90° angles, to provide a seat against which the ring gasket is abutted.

The collar 14 is of sufficient width so that the fixed flange 13 limits the angular adjustment of the elements to a predetermined maximum beyond which the gasket G would be out of effective sealing contact with the concave surface 17 of the element C.

The outer circumference of the collar 14 of the inner element C¹ is of smaller diameter than the largest inner diameter of the outer element C.

An elastic ring gasket G of annular form and of rectangle or rhomboid dimensions in cross section abuts the inner concave surface of the outer coupling element C¹, and the surface 11 of the said gasket G is exposed to the fluid pressure of the annular space 18. The outer peripheral edge 11a of gasket G is seated against the inner concave surface of the outer coupling element C, the gasket G when exposed to the internal fluid pressure being deformed thereby, the pressure which deforms the said gasket G causing the outer peripheral surface of said gasket G to conform to the inner concave surface of the outer element C to seal the coupling elements in various positions of angular adjustment.

The inner peripheral edge of the outer coupling element C is adapted to be welded along the line 12 to a pipe section P to secure the element to the pipe section.

The inner peripheral edge of the inner coupling element C¹ is adapted to be welded along the line 15 or 15a to a pipe section P¹ to secure the element to the pipe section.

With the coupling elements C and C¹ secured to the confronting ends of the pipe sections P and P¹ and the inner element C¹ extended into the outer element C and the edge 11a of the gasket G confronting the inner concave surface of the outer element C and with said gasket G abutted against the surface of perforated disc 16 and the collar 14, the coupling elements will be spaced apart. The annular space 18 exposes the surface 11 of the gasket G to the internal fluid pressure within the coupled pipe sections and the fluid is free to exert force against the surface 11 of the gasket and deform the gasket to seal the joint between the elements.

A loose ring 21, the internal diameter of which is less than the external diameter of the outer coupling element C, engages the outer convex surface of this coupling element C.

In order to secure the coupling elements together, two or more lugs 19, engaging the ring and flange 13, are spaced at various locations circumferentially to confine the ring against displacement laterally away from the flange.

The lugs 19 are connected in this case to the outer surface of a double ended curved spring band 22. The spring band 22 when unextended is smaller of radius than the ring 21 and when extended retains the lugs in position laterally against the circumference of the ring or flange.

It has been found in practice that, with the coupling elements loosely connected to permit coupling or uncoupling with the utmost ease and dispatch to the end of permitting the use of portable surface pipe lines which can be readily moved from one location to another on surfaces of uneven contour, an effective seal against leakage of fluid under pressure within the piping is obtained by the use of a gasket of suitable elasticity and area of cross section.

It will be manifest that the coupling elements, ring and lugs can be readily pressed from sheet metal of suitable gauge into the shapes described and the spring band easily rolled to the desired shape thus permitting inexpensive construction.

It will be observed that the convex concave surfaces of the outer coupling element C enable the elements to be relatively adjusted angularly for connection in various positions of angular relationship, and that the elastic gasket is confined against displacement by abutment against the disc 16; and it will be noted that the outer peripheral edge 10 of the outer coupling element C co-acts with the flange 13 to limit the angular adjustment of the elements to a predetermined maximum beyond which the gasket G would be out of effective sealing contact with the surface 17 of the element C.

What is claimed is:

1. An adjustable pipe coupling comprising a pair of inner and outer coupling elements to which pipe sections are adapted to be connected; the outer element having annular surfaces of convex and concave cross section, the inner element comprising a perforated disc having a shoulder extending axially from the inner peripheral edge thereof, and the outer peripheral edge thereof having a collar, the collar having an outwardly extending fixed flange, an elastic ring gasket of approximately rectangular or rhomboid dimensions in cross section interposed between the coupling elements and carried by the shoulder of the inner element and being in an abutting relation to the inner concave surface of the outer element, said gasket having suitable elasticity and area of cross section so that when exposed to the internal fluid pressure it is deformed, thereby causing the outer peripheral surface of the gasket to conform to the inner concave surface of the outer element, thereby providing a fluid tight seal between the coupling elements, a loose ring of internal diameter less than the outer diameter of the outer coupling element, for engagement with the outer surface thereof, and means to confine the loose ring against displacement away from the flange.

2. An adjustable pipe coupling comprising a pair of inner and outer coupling elements to which pipe sections are adapted to be connected; the outer element having annular surfaces of convex and concave cross section, the inner element comprising a perforated disc with a shoulder extending axially from the inner peripheral edge thereof, and the outer peripheral edge thereof having an annular collar, the collar having an outwardly extending fixed flange, an elastic ring gasket of approximately rectangular or rhomboid dimensions in cross section interposed between the coupling elements and carried by the shoulder of the inner element and being in abutting relation to the inner concave surface of the outer element, said gasket having suitable elasticity and area of cross section so that when exposed to the internal fluid pressure same will be deformed thereby, so as to cause the outer peripheral surface of the gasket to conform to the inner concave surface of the outer element, thereby providing a fluid tight seal between the coupling elements, a loose ring of internal diameter less than the outer diameter of the outer coupling element, for engagement with the outer surface thereof, and means to confine the loose ring against displacement away from the flange, comprising two or more lugs spaced at various positions circumferentially, said lugs having lips to engage the loose ring and the fixed flange and to confine the loose ring against displacement away from the flange.

3. A pipe coupling comprising a pair of complementary elements having portions formed for fixed connection with alined pipes, a gasket of pliable material interposed between said elements, the elements mutually co-acting to provide an annular space between the confronting ends of the alined pipes so as to expose the gasket to the internal fluid pressure within said pipes, the gasket being seated against one of the elements and having a surface disposed in such relationship to an internal face of the other element as to cause deformation of said gasket by the action of applied internal pressure against the gasket, and to thereby effect a seal between both elements, a ring freely embracing the other element, and a circumferentially adjustable member of springy material having means for directly engaging said one element and the ring and operating to flexibly connect both elements together and to maintain a sealed relationship of said elements to the gasket.

GEORGE SMITH MANN.